US006340086B1

(12) United States Patent
McConnaughy et al.

(10) Patent No.: US 6,340,086 B1
(45) Date of Patent: Jan. 22, 2002

(54) MEDIA STORAGE APPARATUS

(76) Inventors: Michael P. McConnaughy, 19516 N. 17st Ave., Glendale, AZ (US) 85308; Darren K. Grady, 12209 S. Bannock, Phoenix, AZ (US) 85044

( * ) Notice: Subject to any disclaimer, the term of this patent is extended or adjusted under 35 U.S.C. 154(b) by 0 days.

(21) Appl. No.: 09/479,806

(22) Filed: Jan. 8, 2000

(51) Int. Cl.[7] ...................... B65D 85/575; B65D 85/57; A47G 29/00
(52) U.S. Cl. .................... 206/307.1; 211/40; 211/41.12
(58) Field of Search .......................... 206/307.1, 308.1, 206/308.3, 387.14; 211/40, 41.12

(56) References Cited

U.S. PATENT DOCUMENTS

| | | | |
|---|---|---|---|
| 3,756,383 A | * 9/1973 | Kryfer | .................... 206/387.14 |
| 4,432,453 A | 2/1984 | Berkman | |
| 4,440,458 A | * 4/1984 | Berkman | ........... 206/387.14 X |
| 4,705,159 A | * 11/1987 | Mastronardo | ............ 206/307.1 |
| 4,705,169 A | 11/1987 | Mastronardo | |
| 4,744,463 A | * 5/1988 | Merzon | .................... 206/387.14 |
| 4,960,205 A | * 10/1990 | Wang | ..................... 206/307.1 |
| 5,191,983 A | 3/1993 | Hardy | |
| 5,380,079 A | 1/1995 | Hamilton | |
| 5,393,135 A | 2/1995 | Tisbo et al. | |
| 5,399,004 A | 3/1995 | Buschle | |
| 5,558,235 A | 9/1996 | Hunt | |
| 5,597,216 A | * 1/1997 | Real et al. | ........... 206/307.1 X |
| 5,598,921 A | 2/1997 | Hunt | |
| D380,639 S | 7/1997 | Tisbo | |
| D381,546 S | 7/1997 | Hunt | |
| 5,647,487 A | 7/1997 | Reinhard | |
| 5,685,423 A | * 11/1997 | Hunt | ....................... 206/307.1 |
| D387,928 S | 12/1997 | Hunt | |
| 5,715,948 A | 2/1998 | Hung | |
| 5,727,695 A | * 3/1998 | English, II | .................... 211/40 |
| 5,740,924 A | 4/1998 | Hunt | |
| 5,823,332 A | * 10/1998 | Clausen | .................... 206/307.1 |
| 5,833,062 A | * 11/1998 | Yeh | ......................... 206/307.1 |
| 5,934,463 A | * 8/1999 | Yu | ........................... 206/307.1 |
| 6,059,123 A | * 5/2000 | Cotutsca | ...................... 211/40 |

OTHER PUBLICATIONS

"Universal Flip System—361/362" brochure, Spectrum Concepts, address and date unknown.
"Universal Rail System—310/320" brochure, Spectrum Concepts, address and date unknown.
"Universal Diskette Rack—410" brochure, Spectrum Concepts, address and date unknown.
"Universal Vertical Rail—330" brochure, Spectrum Concepts, address and date unknown.

* cited by examiner

Primary Examiner—Bryon P. Gehman
(74) Attorney, Agent, or Firm—Sullivan Law Group

(57) ABSTRACT

A media storage device for storing a plurality of media, such as compact disks, audio cassettes, VHS cassette tapes, DVD cartridges, and ZIP disks. The media storage device comprises a tray including a bottom panel and a plurality of media storage bins. Each media storage bin includes a front panel and a first shoulder member. The first shoulder member includes first and second shoulders, and the second shoulder member includes first, second and third shoulders. Each storage bin can include six cavities, wherein each of the cavities supports at least one type of media format. The base and tray can include transportation guide mechanisms that allow the tray to be moved relative to the base to facilitate viewing and access to the stored media.

8 Claims, 8 Drawing Sheets

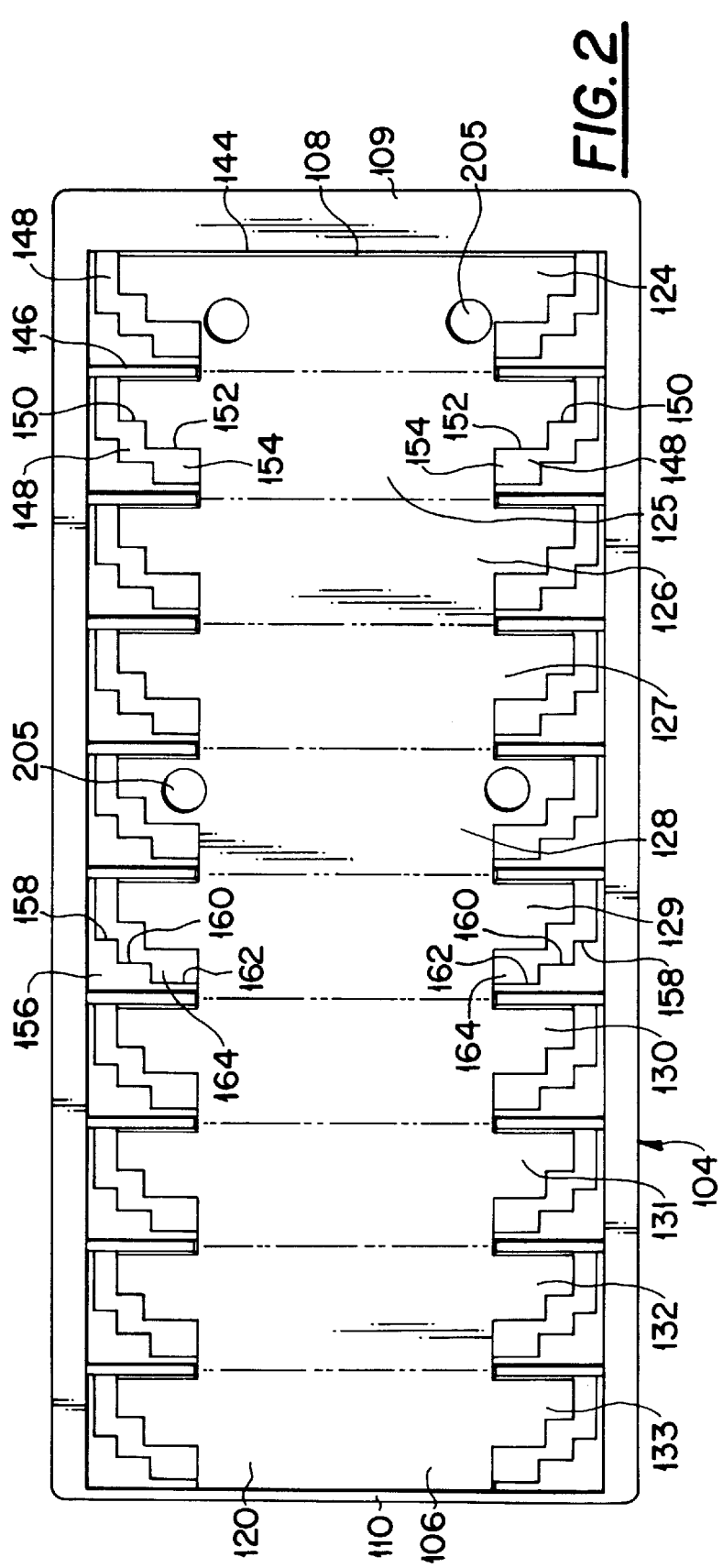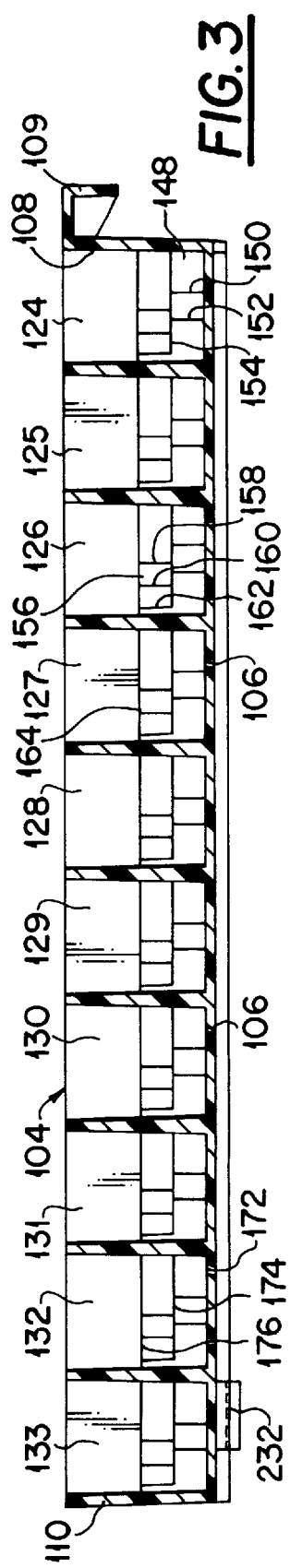

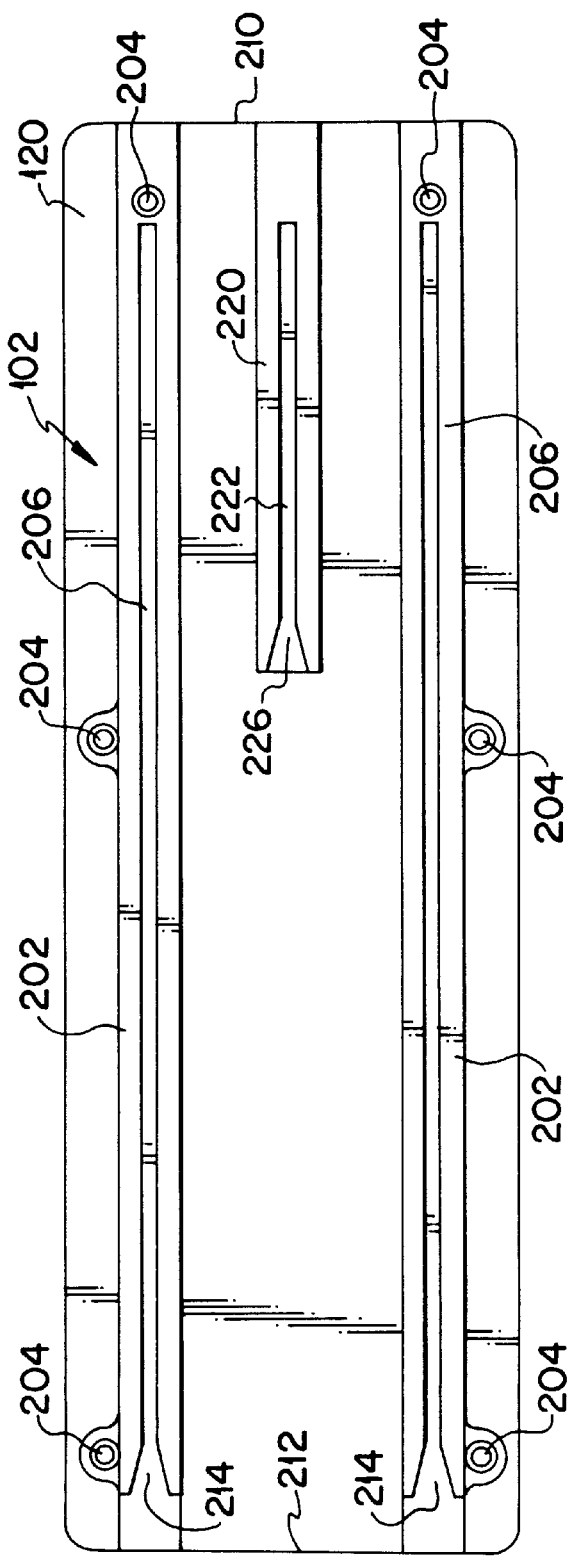
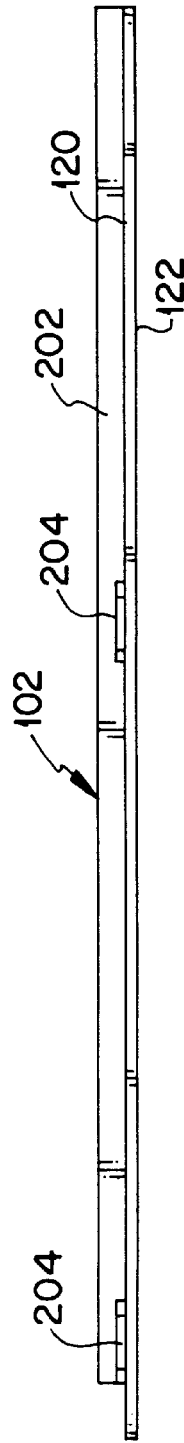
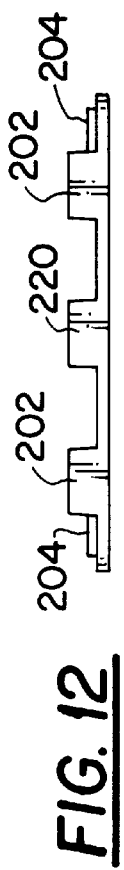
FIG. 10
FIG. 11
FIG. 12

MEDIA STORAGE APPARATUS

BACKGROUND OF THE INVENTION

1. Field of the Invention

The present invention relates to media storage devices and methods and, more specifically, to media storage devices and methods capable of storing multiple forms of media, or multiple media containment apparatus.

2. Description of the Related Art

Media for recording various forms of information come in a variety of forms. Examples of such media include audio cassette tapes and compact disks for music recordings; VHS cassettes, 8 mm cassettes and DVD for recorded video; game cartridges for computerized games; diskettes, Zip drive disks and tape cassettes for recording computer data; and the like. Each of these media typically is stored in a case or similar packaging to protect it from dust, contamination, damage, etc.

Having the ability to store such media is a necessary part of owning them. Accordingly, in recent years, a number of products have been commercially introduced for storing and organizing such media. In some instances, the media storage devices include the ability to store more than one form of media. Examples of such devices include the mixed media storage devices disclosed in U.S. Pat. No. 5,685,423, issued to Hunt on Nov. 11, 1997, and U.S. Pat. No. 4,705,169, issued to Mastronardo on Nov. 10, 1987. Media storage devices also have been introduced that permit storage of media in both packaged or unpackaged form, e.g., with or without the case in which the media is stored. An example is provided in U.S. Pat. No. 4,432,453, issued to Berkman on Feb. 21, 1984.

Prior or known media storage devices typically are designed to be placed on a surface, such as on a table top, book shelf, and the like. When placed on a shelf or surface of a shelved device, such as on the shelf of a bookcase, entertainment center, etc., it can be difficult or inconvenient to gain access to the stored media. Some of the media, for example, usually is stored at the back of the storage device, and is not readily accessible because of shelving or other structures above the storage device. An example would be the shelf of a bookshelf immediately above the shelf upon which the media storage device rests.

Another limitation of prior or known media storage devices is that they do not conveniently store a wide variety of media in a compact arrangement. This can require that the area taken up by the storage device be unnecessarily large.

3. Objects of the Invention

Accordingly, an object of the present invention is to provide a media storage device that can store a plurality of media having different media formats.

Another object of the invention is to provide a media storage device that can store a plurality of media in a relatively small space.

Another object of the invention is to provide a media storage device that can store media so that the media are readily accessible for viewing and selection.

Additional objects and advantages of the invention will be set forth in the description, which follows, and in part will be apparent from the description, or may be learned by practice of the invention. The objects and advantages of the invention may be realized and obtained by means of the instrumentalities and combinations pointed out in the appended claims.

SUMMARY OF THE INVENTION

To achieve the foregoing objects, and in accordance with the purposes of the invention as embodied and broadly described in this document, a media storage device is provided for storing a plurality of media. The media storage device comprises a tray including a bottom panel and a plurality of media storage bins. Each media storage bin includes a front panel and a first shoulder member. The first shoulder member includes first and second shoulders.

In the presently preferred embodiments as disclosed herein, the bottom panel is disposed at a first level. In these embodiments, the first shoulder member includes a first ledge defining a second level above the first level, and the media storage device further includes a second shoulder member disposed above the first shoulder member. The second shoulder member includes a second ledge defining a third level above the first and second levels.

Preferably, each of the media storage bins includes a first cavity defined by the bottom panel and the first shoulders of the first shoulder member. Also preferably the first shoulders of the first shoulder member have a height and width for supporting a single compact disk case having a hinged side in the first cavity when the single compact disk case is disposed in the media storage device with the hinged side toward the bottom panel.

In the preferred embodiments as disclosed herein, each of the media storage bins includes a second cavity defined by the bottom panel and the first shoulders of the second shoulder member. The first shoulders of the second shoulder member preferably have a height and width for supporting an audio cassette case having a hinged side within the second cavity when the audio cassette case is disposed in the media storage device with the hinged side toward the bottom panel.

In some embodiments of the invention, the first shoulder member includes a first ledge disposed above the bottom panel. In such instances, the media storage device may further include a second shoulder member disposed above the first shoulder member, and the second shoulder member may include first, second and third shoulders.

In some presently preferred embodiments of the invention, each of the media storage bins includes a third cavity defined by the first ledge and the first shoulders of the second shoulder member. In such instances, the first shoulders of the second shoulder member may have a height and width for supporting a single compact disk case having a lateral side within the third cavity when the single compact disk case is disposed in the media storage device with the lateral side toward the bottom panel.

In some presently preferred embodiments of the invention, each of the media storage bins includes a fourth cavity defined by the first ledge and the second shoulders of the second shoulder member. In such instances, the second shoulders of the second shoulder member may have a height and width for supporting a single compact disk case having a lateral side within the fourth cavity when the single compact disk case is disposed in the media storage device with the lateral side toward the bottom panel.

In some embodiments of the invention, each of the media storage bins includes a fifth cavity defined by the first ledge and the third shoulders of the second shoulder member. In these embodiments, the third shoulders of the second shoulder member may have a height and width for supporting a VHS cassette case.

In some embodiments of the invention, the second shoulder member includes a second ledge disposed above the bottom panel and the first ledge, each of the media storage bins includes a back panel disposed above the second shoulder member, and each of the media storage bins includes a sixth cavity defined by the second ledge and the back panel for that media storage bin. In such embodiments, the back panel may have a height and a width to support a large VHS cassette case within the sixth cavity. In addition, the back panel for each of the storage bins may have a height and a width to support a compact disk case having a lateral side in the sixth cavity when the compact disk case is disposed in the media storage device with the lateral side toward the bottom panel.

The tray may include a tray transportation guide mechanism. In such instances, the media storage device may include a base having at least one fastener for fastening the base to a support surface, and the base may include a base transportation guide mechanism for cooperating with the tray transportation guide mechanism.

In accordance with another aspect of the invention, a media storage device is provided for storing a plurality of media. The media storage device according to this aspect of the invention comprises a tray including a bottom panel and a plurality of media storage bins. Each media storage bin includes a front panel and a second shoulder member disposed above the bottom panel. The second shoulder member includes first, second and third shoulders.

In some preferred embodiments, each of the media storage bins includes a third cavity defined by the bottom panel and the first shoulders of the second shoulder member. In such embodiments, the first shoulders of the second shoulder member may have a height and width for supporting a single compact disk case having a lateral side within the third cavity when the single compact disk case is disposed in the media storage device with the lateral side toward the bottom panel.

In some embodiments, each of the media storage bins includes a fourth cavity defined by the bottom panel and the second shoulders of the second shoulder member. In such embodiments, the second shoulders of the second shoulder member may have a height and width for supporting a single compact disk case having a lateral side within the fourth cavity when the single compact disk case is disposed in the media storage device with the lateral side toward the bottom panel.

In some embodiments, each of the media storage bins includes a fifth cavity defined by the bottom panel and the third shoulders of the second shoulder member. In this instance, the third shoulders of the second shoulder member have a height and width for supporting a VHS cassette case.

In some embodiments, each of the media storage bins includes a back panel disposed above the second shoulder member, and each of the media storage bins includes a sixth cavity defined by the second ledge and the back panel for that media storage bin. In such instances, the back panel has a height and a width to support a large VHS cassette case within the sixth cavity. In addition, the back panel for each of the media storage bins may have a height and a width to support a compact disk case having a lateral side in the sixth cavity when the single compact disk case is disposed in the media storage device with the lateral side toward the bottom panel.

The tray may include a tray transportation guide mechanism. The media storage device may further include a base having at least one fastener for fastening the base to a support panel. The base includes a base transportation guide mechanism for cooperating with the tray transportation guide mechanism.

In accordance with another aspect of the invention, a storage device is provided for storing a plurality of media on a support surface. The media is of more than one type. The media storage device comprises a base including at least one fastener for fastening the base to the support surface. The base including a base transportation guide mechanism. The media storage device further includes a tray including a plurality of media storage bins. Each media storage bin includes a plurality of cavities. Each cavity of a given one of the media storage bins is shaped and sized to support at least one of the media. The tray further includes a tray transportation guide mechanism for cooperating with the base transportation guide mechanism.

The base transportation guide mechanism preferably includes at least one slotted rail, and similarly the tray transportation guide mechanism preferably comprises at least guide flange for slidably engaging the respective at least one slotted rail.

In preferred embodiments according to this aspect of the invention, the device further includes a retaining mechanism for retaining the tray on the base. The retaining mechanism may include a slotted guide rail on the base and a guide flange on the tray for slidably engaging the slotted guide rail on the base.

In accordance with another aspect of the invention, a media storage device is provided for storing a compact disk and a plurality of media. The media storage device comprises a tray including a bottom panel, a front wall, a back wall, and a pair of side walls. It also includes a plurality of first tab pairs, each first tab pair forming and defining a seventh cavity for supporting a ZIP disk case, and a plurality of second tab pairs, each second tab pair forming and defining an eighth cavity for supporting a compact disk case.

BRIEF DESCRIPTION OF THE DRAWINGS

The accompanying drawings, which are incorporated in and constitute a part of the specification, illustrate a presently preferred embodiments of the invention and, together with the general description given above and the detailed description of the preferred embodiments given below, serve to explain the principles of the invention.

FIG. 2 shows a top view of the tray shown in FIG. 1;

FIG. 3 shows a side cutaway view of the tray shown in FIG. 1;

FIG. 10 shows a top view of the base shown in FIG. 1;

FIG. 11 shows a side view of the base shown in FIG. 1;

FIG. 12 shows a front end view of the base shown in FIG. 1;

DETAILED DESCRIPTION OF THE PREFERRED EMBODIMENTS

Figure 1:
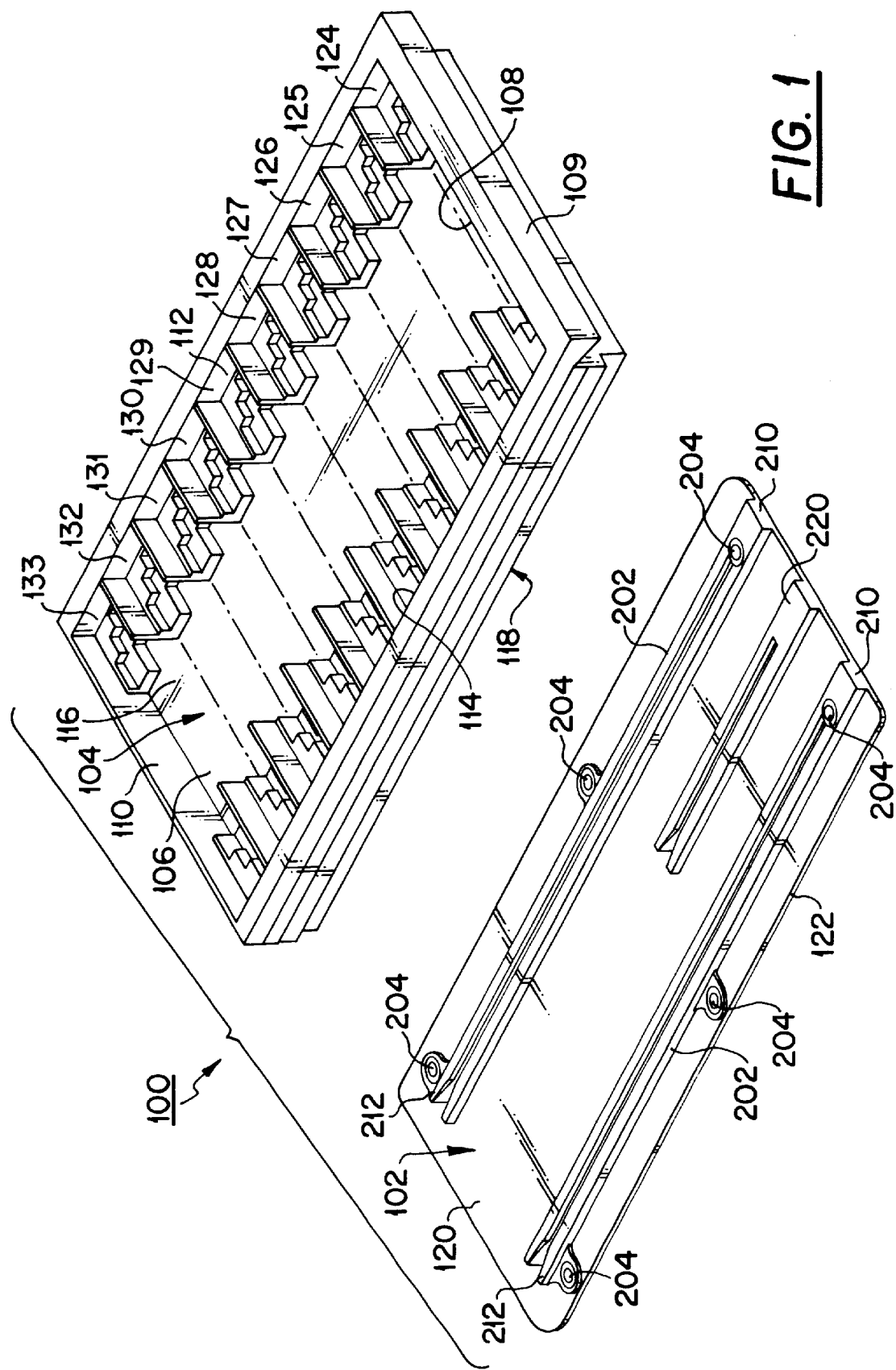
FIG. 1 shows a media storage device according to a first preferred embodiment of the invention, including a tray and a base.

Reference will now be made in detail to the presently preferred embodiments of the invention as illustrated in the accompanying drawings, in which like reference characters designate like or corresponding parts throughout the drawings. It should be noted, however, that the invention in its broader aspects is not limited to the specific details, representative devices and methods, and illustrative examples shown and described in this section in connection with the preferred embodiments. The invention according to its various aspects is particularly pointed out and distinctly claimed in the attached claims read in view of this specification, and appropriate equivalents.

In accordance with one aspect of the invention, a media storage device is provided for storing a plurality of media. The media may include such things as audio cassette tapes, compact disks ("CD") (single or double), DVD cartridges, and VHS video cassettes (in standard packaging sizes and in large or "display" sized containers). Media as the term is used herein refers to the actual storage media, such as a cassette itself, but preferably includes the actual media enclosed in its case or packaging.

The media storage device according to this aspect of the invention comprises a tray having a bottom panel and a plurality of media storage bins. Each media storage bin includes a front panel and a first shoulder member. The first shoulder member includes first and second shoulders.

A media storage device 100 according to a preferred embodiment of this aspect of the invention is shown in FIG. 1. Media storage device 100 includes a base 102 and a tray 104. Tray 104 slidably attaches to base 102, as will be further described below.

Figure 4:
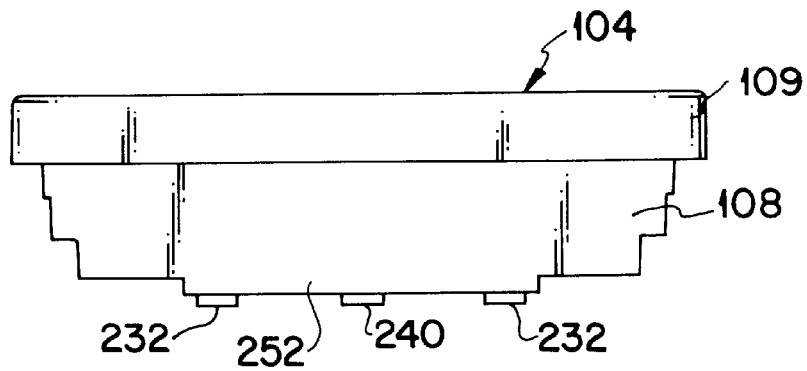
FIG. 4 shows a front view of the tray of the media storage device of FIG. 1.

Tray 104 includes a bottom panel 106, a front wall 108, a back wall 110, and right and left sides 112 and 114, respectively. Bottom panel 106 comprises a substantially planar surface having a top side 116 and a bottom side 118. A handle 109 is attached to the top portion of front wall 108, as shown for example in FIG. 3. Back wall 110, a rear view of which is shown in FIG. 4, is a substantially planar panel.

Base 102 also comprises a substantially planar surface, and includes a top side 120 and a bottom side 122. Bottom side 122 of base 102 may be adapted to reside on a support surface (not shown), such as a shelf of a bookcase or entertainment center.

Tray 104, a top view of which is shown in FIG. 2, includes a plurality of media storage bins 124 through 133, each of which is identical to the others, with the exception of the front and back walls of the first and last media storage bin. In this preferred embodiment, there are ten such bins in tray 104, but this is not limiting. Each storage bin can store one or more media items, depending upon the specific media, as will be further described below.

In accordance with this aspect of the invention, each media storage bin includes a front panel. In the preferred embodiment, each media storage bin includes a front panel 144 and a rear panel 146. Front panel 144 for the first storage bin comprises the interior portion of front tray wall 108. Rear panel 146 of the last or rearward-most storage bin comprises back wall 110 of tray 104. For each successive storage bin starting from the first storage bin, front panel 144 of that bin is part of rear panel 146 of the adjacent bin.

It is not necessary that the front and rear panels comprise complete walls extending all of the way from right wall 112 to left wall 114. As shown in the preferred embodiment of FIG. 1, for example, the front and rear panels may comprise tabs, flanges or portions of a complete wall.

Each media storage bin of device 100 includes a first shoulder member 148, comprised of first and second shoulders 150 and 152, respectively. First shoulder member 148 of each storage bin includes a first ledge 154 that is disposed above bottom panel 106. Ledge 154 is substantially planar, and substantially parallel with respect to bottom panel 106.

In accordance with another aspect of the invention, the media storage device further includes a second shoulder member disposed above the first shoulder member. The second shoulder member includes first, second and third shoulders. The second shoulder member includes a second ledge defining a third level above the first and second levels.

As implemented in the preferred embodiment of FIG. 1, media storage device 100 includes a second shoulder member 156 disposed above first shoulder member 148. Second shoulder member 156 is comprised of first, second and third shoulders 158, 160, and 162, respectively. Second shoulder member 156 of each storage bin includes a second ledge 164.

Figure 5:
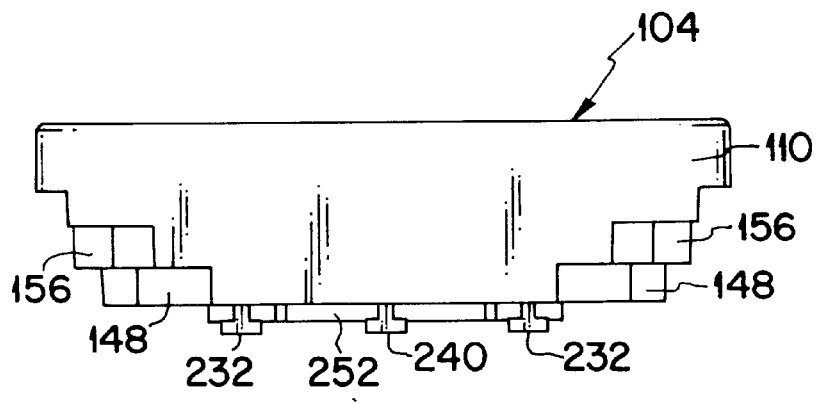
FIG. 5 shows a back view of the tray shown in FIG. 1.
Figure 6:
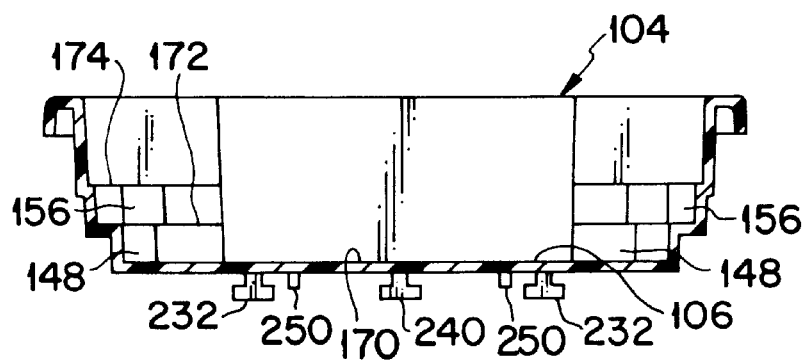
FIG. 6 shows a front cutaway view of the tray shown in FIG. 1.

The media storage bins according to this preferred embodiment are divided vertically (along a direction perpendicular to planar bottom panel 106) into three levels, as illustrated, for example, in FIGS. 5 and 6. Bottom panel 106 forms and defines a first level 170. First ledge 154 formed by the top surface of first shoulder member 148 forms and defines a second level 172. Second ledge 164 formed by the top surface of second shoulder member 156 forms and defines a third level 174.

Figure 7:
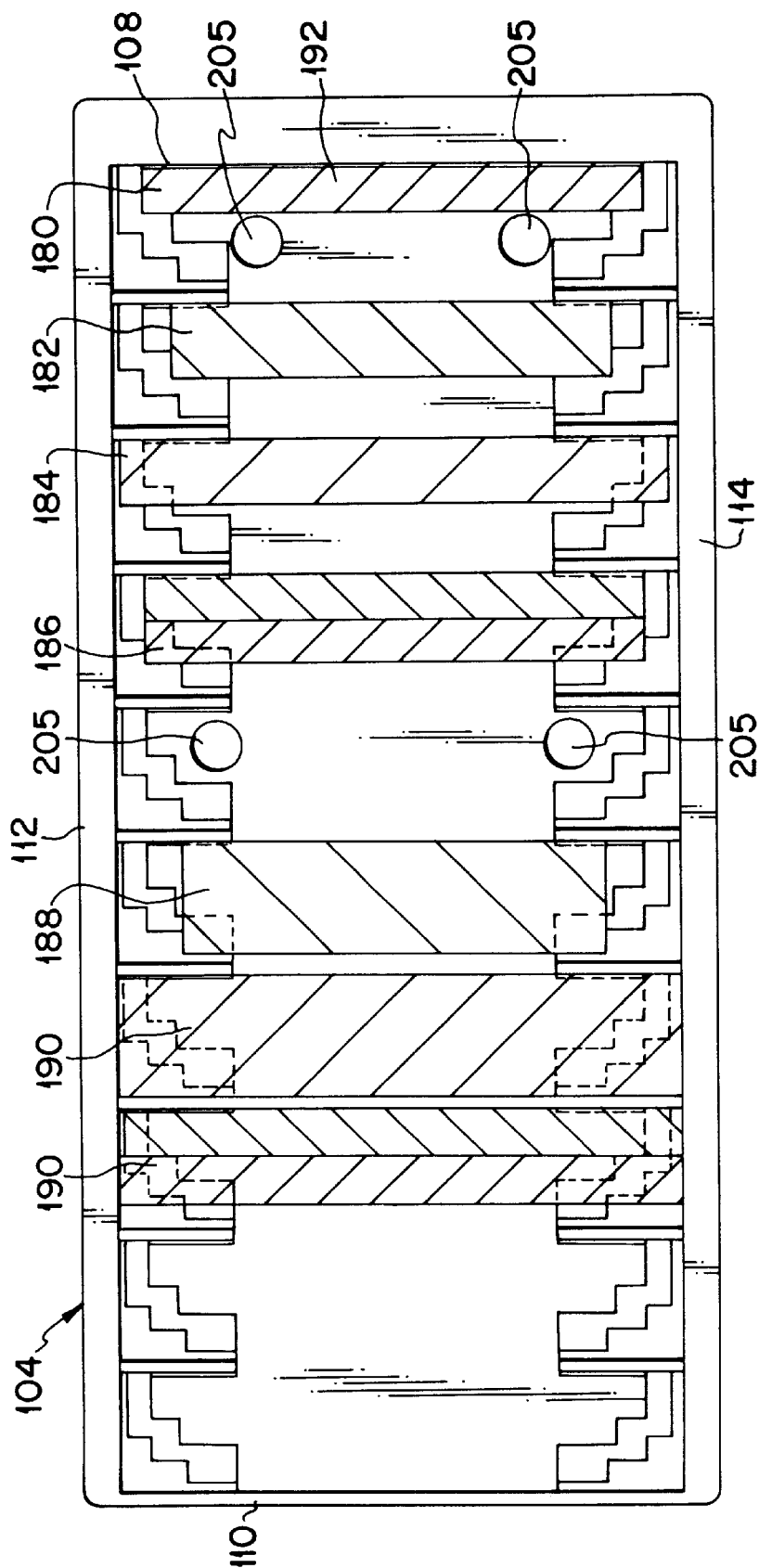
FIG. 7 shows another top view of the tray shown in FIG. 1, including cavities within the individual storage bins.

In accordance with this preferred embodiment and as illustrated, for example, in FIG. 7, each of the media storage bins includes a first cavity 180 defined by bottom panel and the first shoulders of the first shoulder member, a second cavity 182 defined by the bottom panel and the second shoulders of the first shoulder member, a third cavity 184 defined by the first ledge and the first shoulders of the second shoulder member, a fourth cavity 186 defined by the first ledge and the second shoulders of the second shoulder member, a fifth cavity 188 defined by the first ledge and the third shoulders of the second shoulder member, and a sixth cavity 190 defined by the second ledge and the back panel for that media storage bin. Each of these cavities is to a certain extent overlapping with others of the cavities. The cavities are shown in FIG. 7 in separate storage bins to simplify the illustration.

Each of these cavities is sized and shaped to accommodate one or more specific forms of media (optionally but preferably contained in its packaging). In this embodiment, and with respect to first cavity 180, first shoulders 150 of first shoulder member 148 for each storage bin have a height and width for supporting a single compact disk case having a hinged side in the first cavity when the single compact disk case is disposed in media storage device 100 with the hinged side toward the bottom panel. The hinged side of the CD case in standard CD case or "jewel case" is shorter than the lateral sides adjacent to and perpendicular to the hinged side. The hinged side also is referred to herein as the "end" of the CD case. Storage of the CD in media storage device 100 with the hinged side, or the side opposite the hinged side, directed down (closest to bottom panel 106) as shown in the drawing figures is referred to herein as storing the CD end down. Storage of the CD in media storage device 100 with one of the lateral sides down is referred to herein as storing the CD lateral side down.

First cavity 180 is sized and shaped to contain and support a single CD in its case 192, stored end down. Accordingly, first shoulders 150 of first shoulder member 148 have a height and width for supporting a single CD 192 in its case having a hinged side in first cavity 180 when the single CD case is disposed in the media storage device with the hinged side toward the bottom panel, i.e., end down. First cavity 180 is sized and shaped to be slightly larger than the CD case stored end down, so that the CD case can be easily installed in and removed from first cavity 180. This sizing principle preferably applies to each cavity with respect to the media it is intended to store and support, as described more fully below.

Second cavity 182 is sized and shaped to contain and support an audio cassette tape 194 in its case. Accordingly, second shoulders 152 of second shoulder member 156 have a height and width for supporting an audio cassette case 194 having a hinged side within the second cavity when the audio cassette case is disposed in the media storage device with the hinged side toward the bottom panel.

Third cavity 184 is configured to support and store a single or double CD, stored lateral side down, or a DVD cartridge. Accordingly, first shoulders 158 of second shoulder member 156 have a height and width for supporting a single compact disk case 190 or a double compact disk 196 in their case having a lateral side within third cavity 184 when single compact disk case 190 or double compact disk case 196 is disposed in media storage device 100 with the lateral side toward bottom panel 106. Third cavity 184 also is sized and shaped to house and support a DVD cartridge 198 in its standard size container.

Fourth cavity 186 is configured to support and store a second single CD, stored end down, when a first single CD such as CD 190 is stored end down in first cavity 180. Accordingly, second shoulders 160 of second shoulder member 156 have a height and width for supporting a single compact disk case having a lateral side within fourth cavity 186 when the single compact disk case is disposed in media storage device 100 with the lateral side toward bottom panel 106.

Fifth cavity 188 is configured to support and store a standard VHS in its container, when positioned with the end of the VHS directed downwardly toward bottom panel 106. Accordingly, third shoulders 162 of second shoulder member 156 have a height and width for supporting a VHS cassette case.

Sixth cavity 190 is configured to support and house a VHS cassette stored in a large or "display" type case. Such cases are commonly used commercially by such media producers and distributors as the Walt Disney Company for containing their VHS cassettes. Accordingly, sixth cavity 190 is sized and shaped, and back panel 110 has a height and a width, to support a large VHS cassette case within sixth cavity 190. As noted above, back panel 110 need not extend all of the way across tray 104, and may instead comprise one or more panels that only extend part of the way from wall 112 to wall 114. Back panel 110 similarly may comprise a panel disposed between walls 112 and 114, but contacting neither of these walls.

Back panel 110 for each of the storage bins also has a height and a width to support a compact disk case, single or double, having a lateral side in sixth cavity 190 when the compact disk case is disposed in the media storage device with the lateral side toward the bottom panel.

Figure 8:
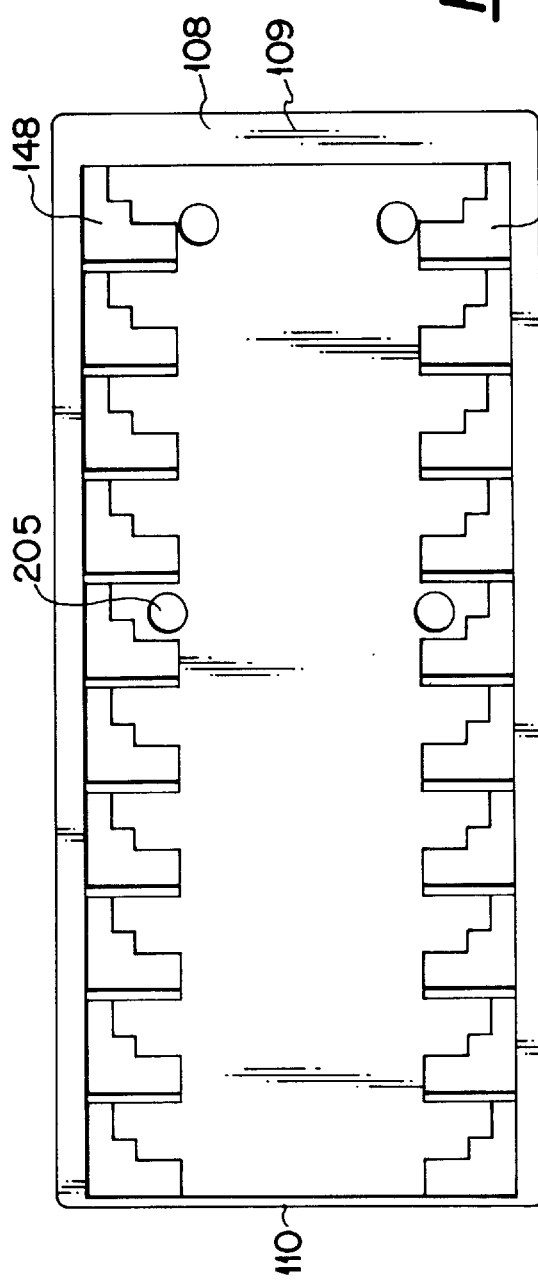
FIG. 8 shows a top view of a tray according to a second preferred embodiment of the invention.

Each of the storage bins of media storage device 100 as described above includes both first shoulder member 148 and second shoulder member 156. This is not, however, necessarily limiting. The storage bins of the media storage device may, for example, have only a first shoulder member such as shoulder member 148, as illustrated in FIG. 8. In this instance, each storage bin preferably would include first cavity 180 and second cavity 182, as described above and shown in the drawing figures. The storage bins also preferably would include sixth cavity 190, but wherein bottom panel 106 serves as the bottom of the cavity, rather than second ledge 164.

Figure 9:
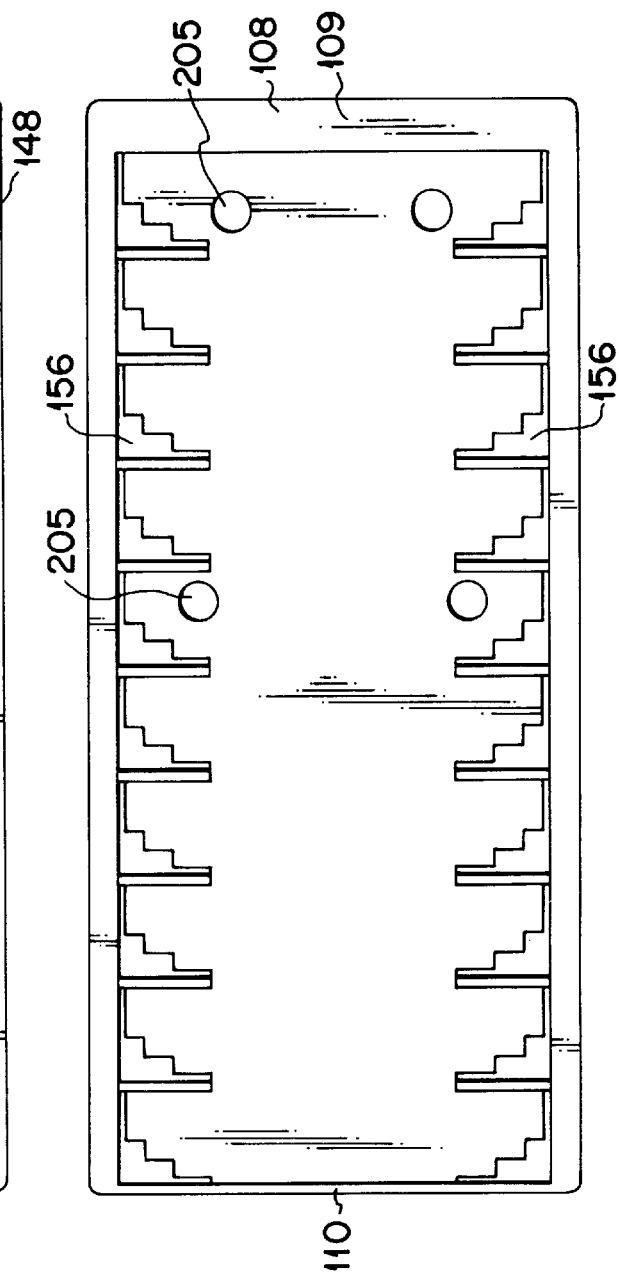
FIG. 9 shows a top view of a tray according to a third preferred embodiment of the invention.

Similarly, each of the storage bins of the media storage device may have only a second shoulder member such as second shoulder member 156, as illustrated in FIG. 9. In this instance, each storage bin preferably would include third cavity 184, fourth cavity 186, and fifth cavity 188 for each storage bin, as described above and shown in the drawing figures. The storage bins also preferably would include sixth cavity 190.

Tray 104 preferably is disposed on base 102 so that base 102 may be fixedly attached to the support, such as the shelf of a bookcase or entertainment center (not shown). Preferably, tray 104 is movably attached to base 102 so that tray 104 may be moved toward the user relative to base 102 when the user desires to inspect the media stored on tray 104. In the presently preferred embodiments, tray 104 is movably configured on base 102 so that tray 104 may be moved relative to base 102.

In accordance with another aspect of the invention, a media storage device is provided for storing a plurality of media on a support surface. The media is of more than one type, for example, as described above. The elements of this media storage device may, and preferably are, incorporated into or are part of the preferred embodiments of the media storage devices as described above and as shown in the drawing figures.

The media storage device according to this aspect of the invention comprises a base including at least one fastener for fastening the base to the support surface. This preferably comprises base 102. The device also includes a tray including a plurality of media storage bins. These elements according to the preferred embodiment of this aspect of the invention comprise tray 104 and storage bins 124 through 133, respectively, each including the first through sixth cavities, as described above and shown in the drawing figures. Each of the cavities is shaped and sized to support at least one of the media, also as described above.

Figure 13:
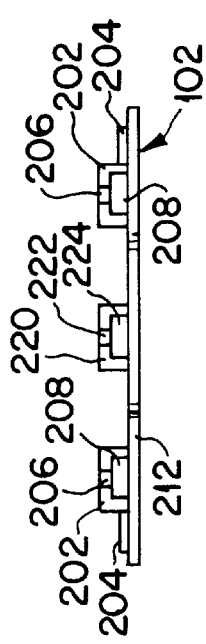
FIG. 13 shows a back end view of the base shown in FIG. 1.
Figure 14:
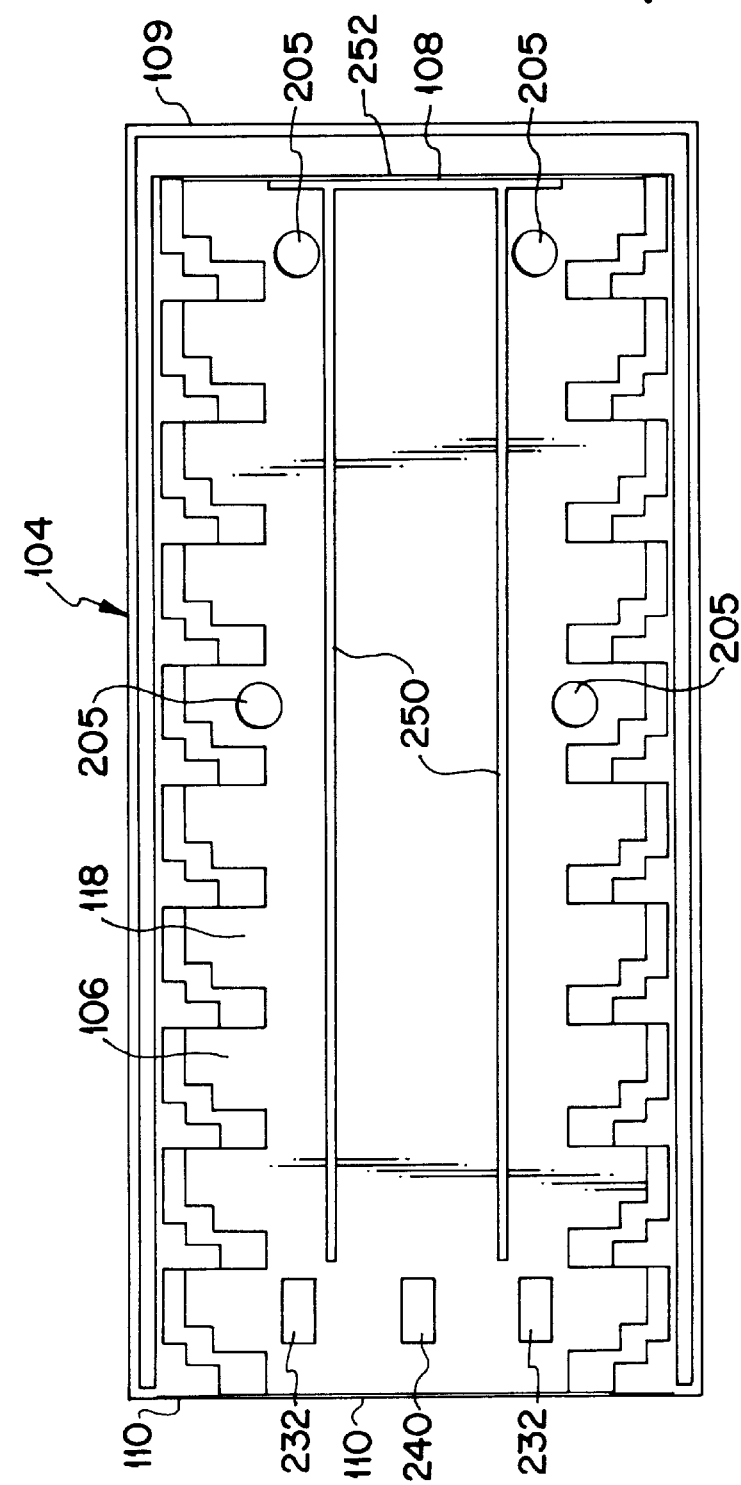
FIG. 14 shows a bottom view of the tray shown in FIG. 1.

The base according to this aspect of the invention includes a base transportation guide mechanism, which in the preferred embodiment comprises base transportation guide mechanism 200, for example, as illustrated in FIG. 10. Base transportation guide mechanism 200 includes at least one, and preferably two, slotted rails 202. Slotted rails 202 are secured to top side 120 of base 102 by a fastener of suitable means, such as rivets, bolts or screws 204. Each one of the slotted rails 202 includes a slot 206 and an internal channel 208, for example, as illustrated in FIG. 13. The front end 210 of slotted rails 202, corresponding in general direction to front wall 108, is closed, as shown, for example, in FIG. 12. The back end 212 of slotted rails 202, corresponding in general direction to back wall 110, opens into a flaired opening 214, for example, as illustrated in FIGS. 10 and 12.

A retaining mechanism is provided for retaining the tray on the base. The retaining mechanism according to the presently preferred embodiments includes a slotted guide rail on the base, and a guide flange on the tray. As implemented in the preferred embodiments, a center slotted rail 220 is disposed on top side 120 of base 102 between and aligned with slotted rails 202. Rail 220 includes a slot 222 and channel 224. Rail 222 and its subcomponents are substantially identical to rails 202, but rail 222 is shorter than them. Rail 220 is closed at the front end adjacent to front wall 108, and includes a flaired opening 226 at the distal end toward back wall 110.

The tray according to this aspect of the invention further includes a tray transportation guide mechanism for cooperating with the base transportation guide mechanism. In accordance with the preferred embodiments, tray 104 includes a tray transportation guide mechanism 230 designed to cooperate with base transportation guide mechanism 200. With reference to FIGS. 3–5 and 14, tray transportation guide mechanism 230 includes a pair of guide flanges 232 disposed on bottom surface 118 of tray 104 adjacent to but spaced from back wall 110. Each guide flange 232 has an inverted T shape, including a center 234 and a cross plate 236. Centers 234 are sized so they movably or slidably pass through and reside within slots 222 of rails 220, and cross plates 236 are sized so they movably or slidably reside within channels 224 but may not pass through slots 222. These guide flanges allow tray 104 to be moved longitudinally with respect to base 102 by sliding within slotted rails 220, but otherwise retain tray 104 on base 102.

Tray 104 also includes as part of the retaining mechanism a guide flange 240 identical to guide flanges 232 and disposed between guide flanges 232 for slidably mating with and cooperating with slotted rail 222 and channel 224, as described above.

A set of rails 250 is disposed longitudinally on bottom surface 118 of tray 104. Rails 250 are positioned so that they slidably contact the inside surfaces of slotted rails 202. A cross rail 252 is disposed on bottom surface 118 of tray 104 substantially perpendicularly with respect rails 250 and at front wall 108. Cross rail 252 provides a stop or abutment against which the front edge 256 of base 102 contacts when tray 104 is positioned over base 102 at its fully engaged position.

In accordance with another aspect of the invention, a media storage device is provided for storing a compact disk and a plurality of media. The media storage device comprises a tray including a bottom panel, a front wall, a back wall, and a pair of side walls. It also includes a plurality of first tab pairs, each first tab pair forming and defining a seventh cavity for supporting a ZIP disk case, and a plurality of second tab pairs, each second tab pair forming and defining an eighth cavity for supporting a compact disk case.

Figure 15:
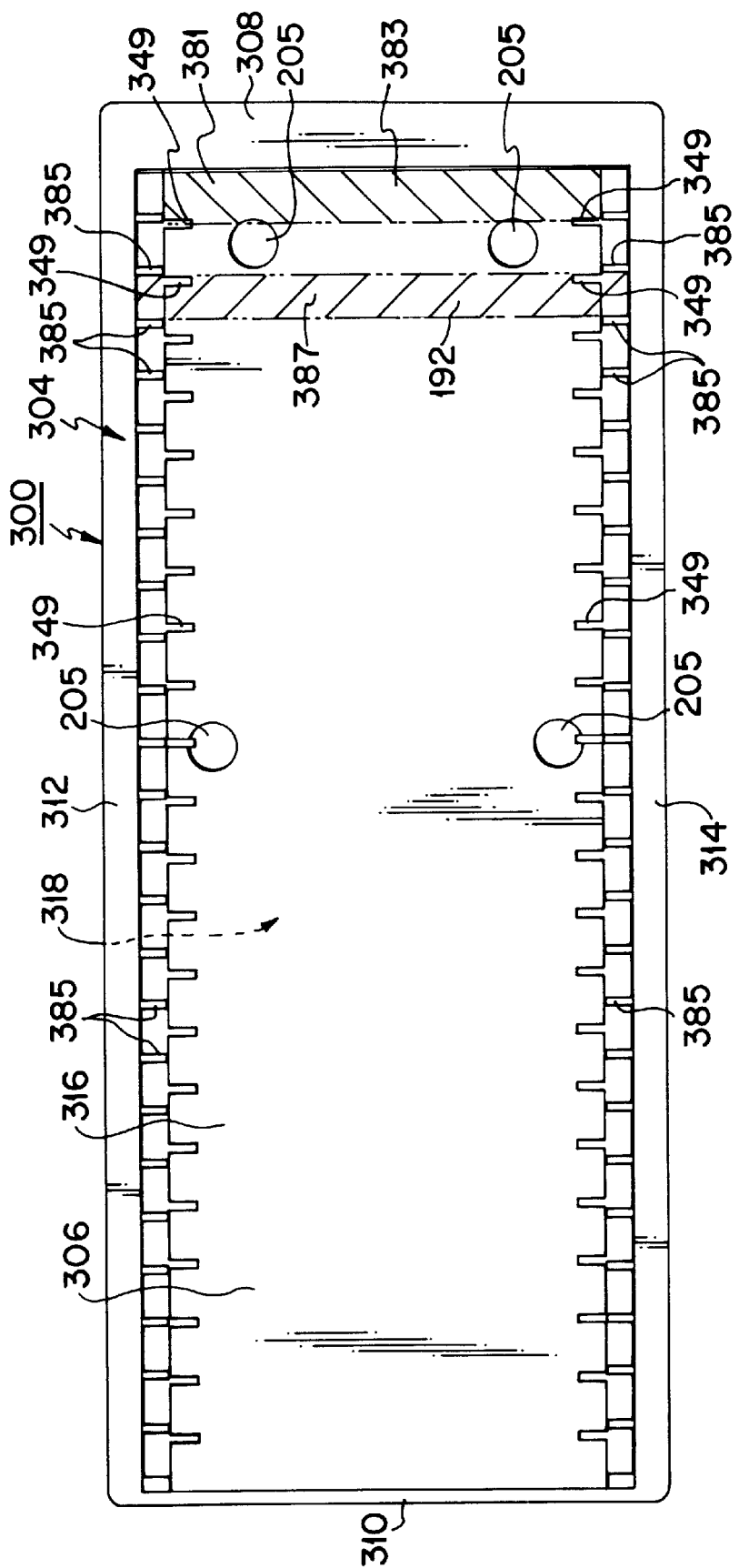
FIG. 15 shows a tray according to a media storage device according to a fourth preferred embodiment of the invention.

A media storage device 300 according to this aspect of the invention is illustrated in FIG. 15. Media storage device 300 has features essentially identical to media storage device 100, but differs in some respects. Media storage device includes a tray 304 including a bottom panel 306, front wall 308, a back wall 310, a pair of side walls, including right wall 312 and left wall 314. Bottom panel 306 has a top side 316 and a bottom side 318.

Media storage device 300 also includes a plurality of first tab pairs 349, each first tab pair forming and defining a seventh cavity 381 for supporting a ZIP disk case 383, and a plurality of second tab pairs 385, each second tab pair forming and defining an eighth cavity 387 for supporting a CD in its case such as CD case 192. The second tab pairs 385 may be sized so that CD 192 is stored end down, or lateral side down, or both.

Additional advantages and modifications will readily occur to those skilled in the art. For example, each storage bin need not necessarily be identical to others of the storage bins. Selected ones of the storage bins, for example, may include the first shoulder member but not the second shoulder member, others of the storage bins in the same device may include the second shoulder member but not the first, and others of the storage bins may include both the first and second shoulder members, and still others may include neither the first or the second shoulder members, e.g., thereby providing only a sixth cavity 190. Moreover, each of the shoulder members need not include all of the shoulders as described herein with respect to the preferred embodiments. The arrangement of the individual storage bins on the tray also is not necessarily limiting. Storage bins, for example, may be positioned side by side, instead of or in addition to the longitudinal or sequential arrangement shown for the preferred embodiments depicted in the drawing figures. In addition, apertures 205 may be disposed in bottom panel 106 of tray 104, and in the other trays illustrated in the drawings figures, corresponding in location to fastener 204 so that an instrument, such as a screw driver, may be passed through the apertures to install or remove such screws or other fasteners. Therefore, the invention in its broader aspects is not limited to the specific details, representative devices and methods, and illustrative examples shown and described. Accordingly, departures may be made from such details without departing from the spirit or scope of the general inventive concept as defined by the appended claims and their equivalents.

What is claimed is:

1. A media storage device for storing a plurality of media, the media storage device comprising:

a tray including a bottom panel and a plurality of media storage bins, each media storage bin including a front panel and a first shoulder member, the first shoulder member including first and second shoulders;

the first shoulder member including a first ledge disposed above the bottom panel; and the media storage device further including a second shoulder member disposed above the first shoulder member, the second shoulder member including first shoulders, second shoulders and a third shoulder;

each of the media storage bins including a cavity defined by the first ledge and the second shoulders of the second shoulder member.

2. A media storage device as recited in claim 1, wherein the second shoulders of the second shoulder member have a height and width for supporting a single compact disk case having a lateral side within the cavity when the single compact disk case is disposed in the media storage device with the lateral side toward the bottom panel.

3. A media storage device as recited in claim 1 further comprising:

a plurality of first tab pairs, each first tab pair forming and defining a cavity for supporting a ZIP disk case; and a plurality of second tab pairs, each second tab pair forming and defining a cavity for supporting a compact disk case.

4. A media storage device for storing a plurality of media, the media storage device comprising:

a tray including a bottom panel and a plurality of media storage bins, each media storage bin including a front panel and a first shoulder member, the first shoulder member including first and second shoulders;

the first shoulder member including a first ledge disposed above the bottom panel; and the media storage device further including a second shoulder member disposed above the first shoulder member, the second shoulder member including first shoulders, second shoulders and a third shoulder;

each of the media storage bins including a cavity defined by the first ledge and the third shoulders of the second shoulder member.

5. A media storage device as recited in claim 4, wherein the third shoulders of the second shoulder member have a height and width for supporting a VHS cassette case.

6. A media storage device for storing a plurality of media, the media storage device comprising:

a tray including a bottom panel and a plurality of media storage bins, each media storage bin including a front panel and a first shoulder member, the first shoulder member including first and second shoulders;

the first shoulder member including a first ledge disposed above the bottom panel; and the media storage device further including a second shoulder member disposed above the first shoulder member, the second shoulder member including first shoulders, second shoulders and a third shoulder;

the second shoulder member including a second ledge disposed above the bottom panel and the first ledge;

each of the media storage bins includes a back panel disposed above the second shoulder member; and each of the media storage bins including a cavity defined by the second ledge and the back panel for that media storage bin.

7. A media storage device as recited in claim 6, wherein the back panel has a height and a width to support a large VHS cassette case within the cavity.

8. A media storage device as recited in claim 6, wherein the back panel for each of the storage bins has a height and a width to support a compact disk case having a lateral side in the cavity when the compact disk case is disposed in the media storage device with the lateral side toward the bottom panel.

* * * * *